(12) United States Patent
Hasegawa et al.

(10) Patent No.: US 6,668,966 B2
(45) Date of Patent: Dec. 30, 2003

(54) POWER STEERING DEVICE

(75) Inventors: Yosuke Hasegawa, Saitama (JP); Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 140 days.

(21) Appl. No.: 09/955,439

(22) Filed: Sep. 19, 2001

(65) Prior Publication Data

US 2002/0038738 A1 Apr. 4, 2002

(30) Foreign Application Priority Data

Sep. 29, 2000 (JP) ........................................ 2000-301324
Jun. 14, 2001 (JP) ........................................ 2001-180485

(51) Int. Cl.[7] ................................................ B62D 5/06
(52) U.S. Cl. ........................ 180/417; 180/441; 180/442; 180/908; 137/563
(58) Field of Search ................................ 180/417, 426, 180/908, 441, 429, 442; 417/300, 310; 137/563

(56) References Cited

U.S. PATENT DOCUMENTS

| | | | | |
|---|---|---|---|---|
| 3,099,327 A | * | 7/1963 | McAdams | 180/423 |
| 3,125,028 A | * | 3/1964 | Rohde | 417/300 |
| 4,153,133 A | * | 5/1979 | Anderson | 180/429 |
| 4,203,287 A | * | 5/1980 | Bennett | 137/563 |
| 4,347,048 A | * | 8/1982 | Kawabata et al. | 417/310 |
| 4,673,051 A | * | 6/1987 | Darling et al. | 137/493.3 |
| 5,253,730 A | * | 10/1993 | Hayashi et al. | 180/417 |

* cited by examiner

Primary Examiner—Lesley D. Morris
Assistant Examiner—Daniel Yeagley
(74) Attorney, Agent, or Firm—Birch, Stewart, Kolasch & Birch, LLP

(57) ABSTRACT

To provide a power steering device capable of increasing the degree of freedom in the layout of the various elements, stabilizing the surface of the oil and preventing air from being included or mixing foreign materials with the oil in the oil tank. The power steering device includes a power assist cylinder arranged between a steering shaft and a chassis frame. A control valve is operated by the steering shaft to control the power assist cylinder. An oil pump pressurizes operating oil supplied to the power assist cylinder. Furthermore, an oil tank stores the operating oil, wherein the oil tank is of a closed type and integrally arranged in the oil pump.

20 Claims, 3 Drawing Sheets

POWER STEERING DEVICE

BACKGROUND OF THE INVENTION

1. Field of the Invention

The present invention relates to a power steering device. In particular, the present invention relates to a power steering device, which is preferably used in an all terrain vehicle.

2. Description of Background Art

A power steering device according to the background art is shown in FIG. 3 of the present invention.

The power steering device shown in this figure includes a power assist cylinder 3 arranged between a steering shaft 1 and a chassis frame 2. Furthermore, a control valve 4 is operated by the steering shaft 1 to control the power assist cylinder 3. An oil pump 5 is provided for pressurizing the operating oil supplied to the power assist cylinder 3. Finally, an oil tank 6 for storing the operating oil is of a surrounding atmosphere releasing type and is fixed to the chassis frame 2.

The, the oil pump 5, the oil tank 6 and the control valve 4 are connected to each other through three oil pipes 7.

However, the aforesaid background art is problematic, since the power assist cylinder 3, control valve 4, oil pump 5 and oil tank 6 are separately and individually arranged. Accordingly, the layout or the above elements is restricted when they are installed on the chassis frame 2.

In addition, since the oil tank 6 is of a surrounding atmosphere releasing type, it is possible that the surface of the oil in the oil tank 6 becomes unstable. Furthermore, it is possible that foreign materials enter the oil tank 6 from the outside.

SUMMARY OF THE INVENTION

The present invention has been invented in view of the problems found in the background art. It is an object of the present invention to provide a power steering device capable of increasing the degree of freedom in the layout of the various elements of the power steering device. Furthermore, it is an object of the present invention to provide a device, which can stabilize the surface of the oil in the oil tank and prevent foreign materials from entering into the oil tank.

The power steering device according to a first aspect of the present invention includes a power assist cylinder arranged between a steering shaft and a chassis frame. Furthermore, a control valve is operated by the steering shaft to control the power assist cylinder. An oil pump is provided for pressurizing operating oil supplied to the power assist cylinder. Finally, the oil tank is of a closed type and is integrally installed in the oil pump.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

One preferred embodiment of the present invention will now be described with reference to the accompanying drawings.

Figure 1:
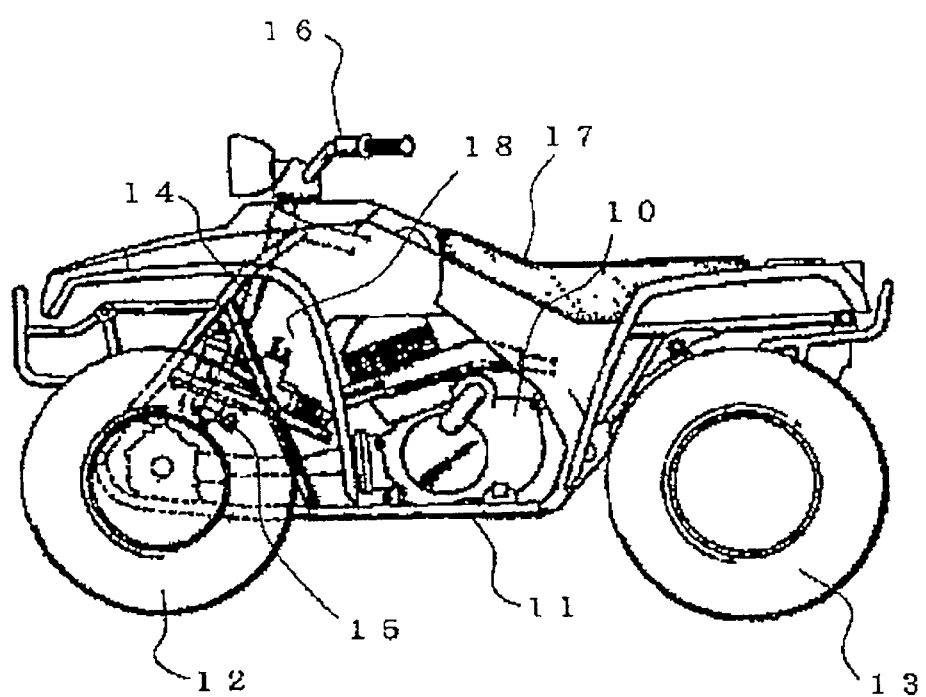
FIG. 1 is a side elevational view illustrating an all terrain vehicle to which one preferred embodiment of the power steering device of the present invention is applied.

FIG. 1 illustrates a straddling type all terrain vehicle. The straddling type vehicle is an example of a vehicle to which the preferred embodiment of the present invention can be applied. The straddling type vehicle is provided with a pair of front wheels 12 and a pair of rear wheels 13 supported in forward or rearward and rightward or leftward directions on a chassis frame 11. An engine 10 is mounted at a central part of the chassis frame 11. A steering shaft 14 is pivotally installed at a front part of the chassis frame 11. A steering arm 15 connects each of the front wheels 12, which act as steering wheels with the steering shaft 14. A steering wheel 16 is installed at the upper part of the steering shaft 14. A seat 17 is installed on the chassis frame 11 at a rear position of the steering wheel 16. Furthermore, a power steering device 18 according to the preferred embodiment of the present invention is installed between a part adjacent to the steering shaft 14 and the chassis frame 11.

Figure 2:
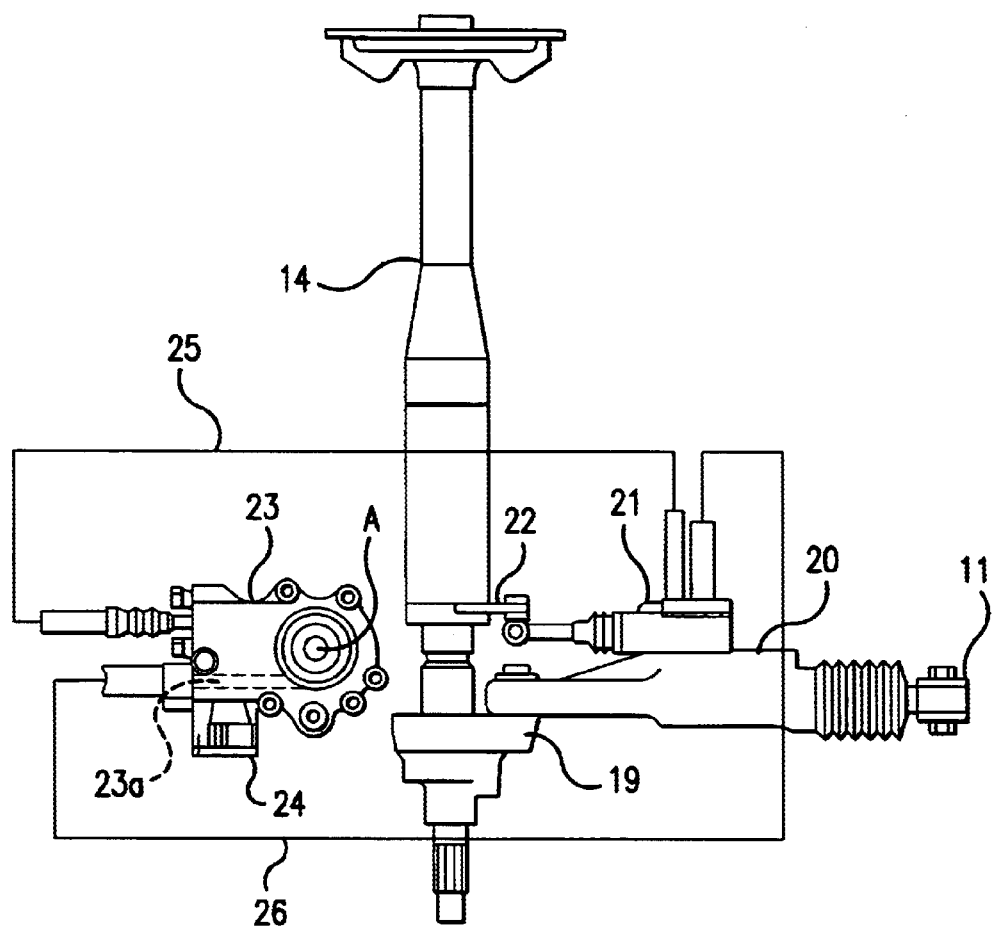
FIG. 2 is a schematic system configuration view illustrating the preferred embodiment of the power steering device of the present invention.
Figure 3:
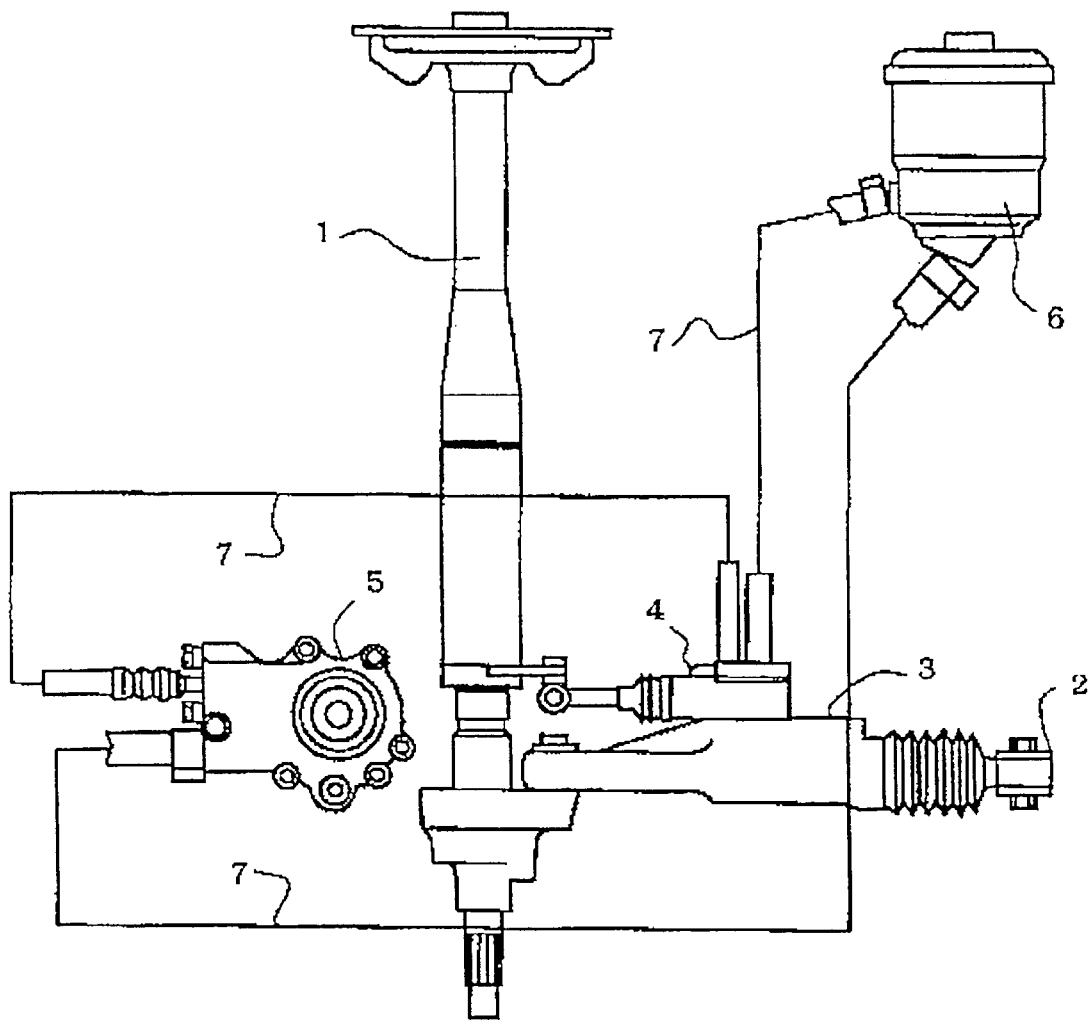
FIG. 3 is a schematic system configuration view illustrating a power steering device according to the background art.

The power steering device 18 according to the preferred embodiment of the present invention is illustrated in FIG. 2. The power steering device 18 is provided with a center arm 19 arranged so as to project in a radial direction at a lower part of the steering shaft 14. A power assist cylinder 20 is installed between the center arm 19 and the chassis frame 11. A control valve 21 is installed at the power assist cylinder 20 to control the power assist cylinder 20. A spool lever 22 is integrally arranged at the steering shaft 14 to operate the control valve 21. An oil pump 23 is installed at the engine 10 for supplying pressurized operating oil to the control valve 21. Furthermore, an oil tank 24 stores the operating oil for the oil pump 23.

The oil pump 23 and the control valve 21 are connected through an operating oil supply pipe 25 for supplying the pressurized operating oil from the oil pump 23 to the control valve 21. Furthermore, an operating oil returning pipe 26 is connected between the control valve 21 and the oil pump 23 for returning the operating oil from the control valve 21 to the oil pump 23.

In the preferred embodiment of the present invention, the oil tank 24 is integrally fixed to the oil pump 23. Furthermore, the oil tank 24 is connected with the oil passage 23a formed in the oil pump 23 for returning operating oil to the oil pump. As can be seen in FIG. 2, the oil passage 23a enters the oil pump 23 at a position offset from the axial center of the oil pump 23, the longitudinal axis of the oil passage 23a being perpendicular to the axis A of the oil pump 23.

In the power steering device 18 according to the preferred embodiment of the present invention constructed as described above, the steering wheel 16 is operated in any one of the rightward or leftward directions. The spool lever 22 fixed to the steering wheel 16 is oscillated to operate the control valve. Furthermore, the operating oil supplied from the oil pump 23 is supplied to the power assist cylinder 20 to allow a turning force of the steering wheel 16 in an operating direction to be transferred to the steering shaft 14 through the center arm 19.

With the arrangement described above, the operating force of the steering wheel 16 can be reduced.

Furthermore, the operating oil discharged out of the power assist cylinder 20 is returned back to the oil tank 24 arranged at the oil pump 23 through the control valve 21 and the operating oil returning pipe 26.

As described above, in the preferred embodiment of the present invention, after the operating oil returning back from the power assist cylinder 20 is returned back to the oil tank 24 arranged at the oil pump 23, the operating oil is supplied to the oil pump 23.

In this case, the oil tank 24 is integrally arranged at the oil pump 23. Accordingly, it is not necessary to arrange the oil tank 24 separately.

With the above construction according to the present invention, it is not necessary to provide a separate mounting space for the oil tank 24. Accordingly, the effective utilization of space for the chassis can be carried out, and the degree of freedom in the layout of the various elements of the power steering device can be increased.

Furthermore, only two oil pipes are required, i.e., an operating oil supply pipe 25 communicating between the oil pump 23 and the control valve 21 and an operating oil returning pipe 26 communicating between the control valve 21 and the oil pump 23. The oil pipe communicating between the oil pump 23 and the oil tank 24 that were required in the background art can therefore be eliminated and the degree of freedom in layout of the various elements of the power steering device of the present invention can therefore be increased.

Furthermore, the oil tank 24 is of a closed type. Accordingly, the oil tank 24 can be used in a state in which air in the oil tank 24 is completely removed. Accordingly, variation in the surface of the oil can be eliminated. In addition, foreign materials such as water or mud can be prevented from merging into the operating oil.

It should be noted that the present invention should not be limited to the various shapes or sizes of the components described in the aforesaid preferred embodiment, but can be designed for a particular application.

For example, by allowing a variation in the volume by forming the oil tank 24 with a bellows structure, the prevention of air as described above can be increased and the variation in the volume caused by a variation in temperature or the like of the operating oil can be compensated for.

As described above, in accordance with the power steering device of the present invention, the oil tank is integrally assembled with the oil pump. Accordingly, it is not necessary to provide a separate mounting space for the oil tank. This provides an effective utilization of the space for the chassis and therefore the degree of freedom in the layout of the various elements of the power steering device can be increased.

Furthermore, the oil pipes used for communicating between the oil pump and the oil tank can be eliminated, thereby also increasing the degree of freedom in the layout of the various elements.

In addition, the oil tank is of a closed type. Accordingly, the oil tank can be used in a state in which air in the oil tank is completely removed. Therefore, variation in the surface of the oil can be eliminated and foreign materials such as water or mud and the like can be prevented from entering into the operating oil.

As mentioned above, the present invention is preferably used in an all terrain vehicle. However, it should be readily apparent to one having ordinary skill in the art that the power steering device can be used in various other vehicles as well.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A power steering device for a vehicle, comprising:

a power assist cylinder, said power assist cylinder being arranged between a steering shaft and a chassis frame of the vehicle;

a control valve operable by said steering shaft to control said power assist cylinder;

an oil pump for pressurizing operating oil supplied to said power assist cylinder; and an oil tank for storing said operating oil, said oil tank being integrally installed in said oil pump, and being connected with an oil passage for returning the operating oil to the oil pump, and further, said oil tank being closed, thus enabling air in the oil tank to be completely removed so that a variation in a surface of the operating oil in the oil tank can be eliminated, and foreign matters can be prevented from merging with the operating oil.

2. The power steering device for a vehicle according to claim 1, wherein the steering shaft includes a spool lever integrally attached thereto, said control valve being attachable to the spool lever to be operable by the steering shaft.

3. The power steering device for a vehicle according to claim 1, further comprising an operating oil supply pipe connected between said oil pump and said control valve, said operating oil supply pipe for supplying the pressurized operating from said oil pump to said control valve.

4. The power steering device for a vehicle according to claim 1, further comprising an operating oil returning pipe connected between said control valve and said oil pump, said operating oil returning pipe for returning the operating oil from said control valve to said oil pump.

5. The power steering device for a vehicle according to claim 3, further comprising an operating oil returning pipe connected between said control valve and said oil pump, said operating oil returning pipe for returning the operating oil from said control valve to said oil pump.

6. The power steering device for a vehicle according to claim 4, wherein said operating oil returning pipe is connected to said oil tank, said oil tank being connected to an oil passage formed in said oil pump for returning the operating oil to said oil pump.

7. The power steering device for a vehicle according to claim 5, wherein said operating oil returning pipe is connected to said oil tank, said oil tank being connected to an oil passage formed in said oil pump for returning the operating oil to said oil pump.

8. The power steering device for a vehicle according to claim 1, wherein the steering shaft includes a center arm projecting radially therefrom, said power assist cylinder being attachable to the center arm for assisting in the rotation of the steering shaft.

9. A power steering device in a vehicle, comprising:

a chassis frame;

a steering shaft rotatably mounted to said chassis frame;

a power assist cylinder, said power assist cylinder being mounted between said steering shaft and said chassis frame;

a control valve operably mounted to said steering shaft to control said power assist cylinder;

an oil pump for pressurizing operating oil supplied to said power assist cylinder; and an oil tank for storing said operating oil, said oil tank being integrally installed in said oil pump, and being connected with an oil passage for returning the operating oil to the oil pump, and further, said oil tank being closed, thus enabling air in the oil tank to be completely removed so that a variation in a surface of the operating oil in the oil tank can be eliminated, and foreign matters can be prevented from merging with the operating oil.

10. The power steering device in a vehicle according to claim 9, wherein said steering shaft includes a spool lever integrally attached thereto, said spool lever being operatively connected to said control valve for operating said control valve.

11. The power steering device in a vehicle according to claim 9, further comprising an operating oil supply pipe connected between said oil pump and said control valve, said operating oil supply pipe for supplying the pressurized operating from said oil pump to said control valve.

12. The power steering device in a vehicle according to claim 9, further comprising an operating oil returning pipe connected between said control valve and said oil pump, said operating oil returning pipe for returning the operating oil from said control valve to said oil pump.

13. The power steering device in a vehicle according to claim 11, further comprising an operating oil returning pipe connected between said control valve and said oil pump, said operating oil returning pipe for returning the operating oil from said control valve to said oil pump.

14. The power steering device in a vehicle according to claim 12, wherein said operating oil returning pipe is connected to said oil tank, said oil tank being connected to an oil passage formed in said oil pump for returning the operating oil to said oil pump.

15. The power steering device in a vehicle according to claim 13, wherein said operating oil returning pipe is connected to said oil tank, said oil tank being connected to an oil passage formed in said oil pump for returning the operating oil to said oil pump.

16. The power steering device in a vehicle according to claim 9, wherein the steering shaft includes a center arm projecting radially therefrom, said power assist cylinder being attached to said center arm for assisting in the rotation of said steering shaft.

17. The power steering device in a vehicle according to claim 1, wherein said oil tank is integrally installed beneath said oil pump.

18. The power steering device in a vehicle according to claim 9, wherein said oil tank is integrally installed beneath said oil pump.

19. The power steering device for a vehicle according to claim 1, wherein the oil passage has a longitudinal axis which is substantially perpendicular to an axis of the oil pump.

20. The power steering device in a vehicle according to claim 9, wherein the oil passage enters the oil pump at a position offset from a center of the oil pump.

* * * * *